US011110753B2

United States Patent
Kouda et al.

(10) Patent No.: US 11,110,753 B2
(45) Date of Patent: Sep. 7, 2021

(54) PNEUMATIC TIRE

(71) Applicant: The Yokohama Rubber Co., LTD., Tokyo (JP)

(72) Inventors: Hiraku Kouda, Hiratsuka (JP); Tatsuro Shinzawa, Hiratsuka (JP); Takanori Uemura, Hiratsuka (JP)

(73) Assignee: The Yokohama Rubber Co., LTD.

( * ) Notice: Subject to any disclaimer, the term of this patent is extended or adjusted under 35 U.S.C. 154(b) by 328 days.

(21) Appl. No.: 16/085,554

(22) PCT Filed: Mar. 15, 2017

(86) PCT No.: PCT/JP2017/010326
§ 371 (c)(1),
(2) Date: Sep. 14, 2018

(87) PCT Pub. No.: WO2017/159712
PCT Pub. Date: Sep. 21, 2017

(65) Prior Publication Data
US 2019/0152272 A1  May 23, 2019

(30) Foreign Application Priority Data
Mar. 15, 2016 (JP) .............................. JP2016-050981

(51) Int. Cl.
*B60C 11/12* (2006.01)
*B60C 11/03* (2006.01)
*B60C 11/04* (2006.01)

(52) U.S. Cl.
CPC ............ *B60C 11/125* (2013.01); *B60C 11/03* (2013.01); *B60C 11/033* (2013.01);
(Continued)

(58) Field of Classification Search
CPC ... B60C 11/125; B60C 11/12; B60C 11/0304; B60C 11/033; B60C 11/1281; B60C 11/1263; B60C 2011/1295
See application file for complete search history.

(56) References Cited

U.S. PATENT DOCUMENTS 6,050,313 A * 4/2000 Tsuda ...................... B60C 11/12
152/209.18
2010/0084062 A1* 4/2010 Miyazaki ............ B60C 11/1281
152/209.18
(Continued)

FOREIGN PATENT DOCUMENTS

EP 213452 A2 * 3/1987
JP 63-137003 A * 6/1988
(Continued)

OTHER PUBLICATIONS

Machine translation for Europe 213452 (Year: 2020).*
(Continued)

*Primary Examiner* — Steven D Maki
(74) *Attorney, Agent, or Firm* — Thorpe North & Western

(57) ABSTRACT

A pneumatic tire has an asymmetrical tread pattern and a designated vehicle mounting direction. A sipe includes a leading-side edge and a trailing-side edge, each provided with a chamfered portion shorter than a length of the sipe, and a non-chamfered region where other chamfered portions do not exist disposed in an area opposite the chamfered portion. The sipe has a maximum depth x (mm) and the chamfered portion has a maximum depth y (mm) that satisfy $x \times 0.1 \leq y \leq x \times 0.3 + 1.0$. The sipe has a constant width in a range from an end portion of the chamfered portion positioned inward in a tire radial direction to a groove bottom of the sipe. A groove area of the chamfered portions and the sipes included within a ground contact region is greater on a vehicle mounting inner side than on a vehicle mounting outer side.

19 Claims, 10 Drawing Sheets

(52) U.S. Cl.
CPC ........ *B60C 11/0304* (2013.01); *B60C 11/042* (2013.01); *B60C 11/12* (2013.01); *B60C 11/1263* (2013.01); *B60C 11/1281* (2013.01); *B60C 2011/0341* (2013.01); *B60C 2011/0386* (2013.01); *B60C 2011/1209* (2013.01); *B60C 2011/1295* (2013.01)

(56) References Cited

U.S. PATENT DOCUMENTS

| | | | |
|---|---|---|---|
| 2015/0210121 A1 | 7/2015 | Sanae | |
| 2016/0039249 A1* | 2/2016 | Takahashi | B60C 11/1236 152/209.15 |
| 2016/0297254 A1 | 10/2016 | Numata | |

FOREIGN PATENT DOCUMENTS

| | | |
|---|---|---|
| JP | 2013-035345 | 2/2013 |
| JP | 2013-537134 | 9/2013 |
| JP | 2015-047977 | 3/2015 |
| JP | 2015-140047 | 8/2015 |
| JP | 2015-231812 | 12/2015 |
| JP | 2016-088165 | 5/2016 |
| WO | WO 2012/032144 | 3/2012 |
| WO | WO 2015/083474 | 6/2015 |

OTHER PUBLICATIONS

Machine translation for Japan 63-137003 (Year: 2020).*
International Search Report for International Application No. PCT/JP2017/010326 dated Apr. 11, 2017, 4 pages, Japan.

* cited by examiner

PNEUMATIC TIRE

TECHNICAL FIELD

The present technology relates to a pneumatic tire, and more particularly to a pneumatic tire having an asymmetrical tread pattern and a designated vehicle mounting direction, wherein a chamfering shape of a sipe is designed to provide improvement in steering stability performance on both dry and wet road surfaces in a compatible manner.

BACKGROUND ART

In the related art, in tread patterns of pneumatic tires, a plurality of sipes are formed in ribs defined by a plurality of main grooves. With such sipes provided, drainage properties are ensured and thus the pneumatic tire exhibits good steering stability performance on wet road surfaces. Nevertheless, when the plurality of sipes are disposed in a tread portion to enhance steering stability performance on wet road surfaces, rib rigidity decreases, resulting in the disadvantage of a decrease in uneven wear resistance performance and steering stability performance on dry road surfaces.

Additionally, various pneumatic tires have been proposed in which sipes are formed in the tread pattern and chamfered (refer to Japan Unexamined Patent Publication No. 2013-537134, for example). When sipes are formed and chamfered, the chamfering shape may cause a loss in an edge effect, and the chamfering dimensions may cause inadequacies in the improvement of steering stability performance on dry road surfaces or the improvement of steering stability performance on wet road surfaces.

SUMMARY

The present technology provides a pneumatic tire that has an asymmetrical tread pattern and a designated vehicle mounting direction, wherein a chamfering shape of a sipe is designed to provide improvement in steering stability performance on both dry and wet road surfaces in a compatible manner.

A pneumatic tire according to the present technology for achieving the above-described object is a pneumatic tire having an asymmetrical tread pattern on both sides of a tire center line and a designated vehicle mounting direction. The pneumatic tire includes, in a tread portion, a plurality of main grooves extending in a tire circumferential direction, a rib defined by the main grooves, and a sipe that extends in a tire lateral direction in the rib. The sipe includes a leading-side edge and a trailing-side edge, each provided with a chamfered portion shorter than a length of the sipe, and a non-chamfered region where other chamfered portions do not exist disposed in an area opposite the chamfered portion. The sipe has a maximum depth x (mm) and the chamfered portion has a maximum depth y (mm) that satisfy a relationship represented by Formula (1) below. The sipe has a constant width in a range from an end portion of the chamfered portion positioned inward in a tire radial direction to a groove bottom of the sipe. The sipe is configured so that a groove area of the chamfered portions and the sipes included within a ground contact region on a vehicle mounting inner side is greater than a groove area of the chamfered portions and the sipes included within a ground contact region on a vehicle mounting outer side.

$$x \times 0.1 \leq y \leq x \times 0.3 + 1.0 \qquad (1)$$

According to the present technology, in the pneumatic tire having an asymmetrical tread pattern on both sides of the tire center line and a designated vehicle mounting direction, and including the sipe extending in the tire lateral direction in the rib defined by the main grooves, the chamfered portions shorter than the length of the sipe are provided to the leading-side edge and the trailing-side edge of the sipe, and the non-chamfered regions where other chamfered portions do not exist are provided in areas of the sipe opposite the chamfered portions, making it possible to enhance the drainage effect on the basis of the chamfered portions and, at the same time, effectively remove a water film by the edge effect in the non-chamfered regions. Therefore, it is possible to significantly improve steering stability performance on wet road surfaces. Moreover, with the chamfered portions and the non-chamfered regions both existing on the leading-side edge and the trailing-side edge, it is possible to maximum such an effect of enhancing wet performance as described above during braking as well as driving. Further, a surface area to be chamfered can be minimized compared to that of a sipe chamfered in the related art, making it possible to improve steering stability performance on dry road surfaces. As a result, it is possible to improve steering stability performance on both dry road surfaces and wet road surfaces in a compatible manner. Further, the groove area of the chamfered portions and the sipes included in the ground contact region on the vehicle mounting inner side is greater than the groove area of the chamfered portions and the sipes included in the ground contact region on the vehicle mounting outer side, making it possible to more effectively improve steering stability performance on dry road surfaces and steering stability performance on wet road surfaces.

According to the present technology, preferably a groove area ratio of the chamfered portions and the sipes in the ground contact region on the vehicle mounting inner side is from 3 to 15% greater than a groove area ratio of the chamfered portions and the sipes in the ground contact region on the vehicle mounting outer side. This makes it possible to effectively improve steering stability performance on both dry road surfaces and wet road surfaces in a compatible manner. More preferably, the groove area ratio is from 5 to 10%.

According to the present technology, preferably the groove area ratio in the ground contact region on the vehicle mounting inner side is from 5 to 20% greater than the groove area ratio in the ground contact region on the vehicle mounting outer side. This makes it possible to effectively improve steering stability performance on both dry road surfaces and wet road surfaces in a compatible manner. More preferably, the groove area ratio is from 8 to 15%.

According to the present technology, preferably a pitch count of groove elements extending in the tire lateral direction in the ground contact region on the vehicle mounting inner side is greater than a pitch count of groove elements extending in the tire lateral direction in the ground contact region on the vehicle mounting outer side. Thus, a size of a block on the vehicle mounting outer side can be increased, making it possible to effectively improve steering stability performance on dry road surfaces.

According to the present technology, preferably the pitch count of the groove elements extending in the tire lateral direction in the ground contact region on the vehicle mounting outer side is from 0.5 to 0.9 times the pitch count of the groove elements extending in the tire lateral direction in the ground contact region on the vehicle mounting inner side. This makes it possible to effectively improve steering stability performance on both dry road surfaces and wet road surfaces in a compatible manner. More preferably, the pitch count is from 0.6 to 0.8 times.

According to the present technology, preferably the sipe is inclined with respect to the tire circumferential direction. With the sipe thus inclined, it is possible to improve pattern rigidity and thus further improve steering stability performance on dry road surfaces.

According to the present technology, preferably an inclination angle of the sipe on an acute angle side with respect to the tire circumferential direction is from 40° to 80°. With the inclination angle of the sipe on the acute angle side in the tire circumferential direction thus set, it is possible to more effectively improve steering stability performance on dry road surfaces. More preferably, the inclination angle is from 50° to 70°.

According to the present technology, preferably the chamfered portion is disposed on the acute angle side of the sipe. This makes it possible to further enhance uneven wear resistance performance. Or, preferably the chamfered portion is disposed on an obtuse angle side of the sipe. This makes it possible to increase the edge effect and further improve steering stability performance on wet road surfaces.

According to the present technology, preferably the sipe is at least partially curved or bent in a plan view. With the sipe at least partially thus formed, a total amount of the edge of each sipe increases, making it possible to improve steering stability performance on wet road surfaces. The sipe as a whole may have an arc shape.

According to the present technology, preferably the chamfered portion opens to the main groove. This makes it possible to further improve steering stability performance on wet road surfaces. Or, preferably the chamfered portion terminates in the rib. This makes it possible to further improve steering stability performance on dry road surfaces.

According to the present technology, preferably an overlap length of the chamfered portion formed on the leading-side edge of the sipe and the chamfered portion formed on the trailing-side edge of the sipe is from −30% to 30% of a sipe length. With the overlap length of the chamfered portions thus appropriately set with respect to the sipe length, it is possible to improve steering stability performance on both dry road and wet road surfaces in a compatible manner. More preferably, the overlap length is from −15% to 15%.

According to the present technology, the chamfered portion is disposed in one location on the leading-side edge and one location on the trailing-side edge of the sipe. With the chamfered portion thus disposed, it is possible to improve uneven wear resistance performance.

According to the present technology, preferably the chamfered portion has a maximum width of from 0.8 to 5.0 times a sipe width. With the maximum width of the chamfered portion thus appropriately set with respect to the sipe width, it is possible to improve steering stability performance on both dry and wet road surfaces in a compatible manner. More preferably, the maximum width is from 1.2 to 3.0 times.

According to the present technology, preferably the chamfered portion extends parallel with the sipe. This makes it possible to improve uneven wear resistance performance, and improve steering stability performance on both dry and wet road surfaces in a compatible manner.

According to the present technology, preferably the sipe further includes a raised bottom portion. This makes it possible to improve steering stability performance on both dry and wet road surfaces in a compatible manner. The bottom of the sipe may be raised on an end portion of the sipe or in an area other than an end portion.

According to the present technology, preferably the raised bottom portion disposed in an area other than an end portion of the sipe has a height of from 0.2 to 0.5 times the maximum depth x of the sipe. With the height of the raised bottom portion disposed in an area other than an end portion of the sipe thus set to an appropriate height, it is possible to improve block rigidity and maintain a drainage effect, and thus improve steering stability performance on wet road surfaces. More preferably, the height is from 0.3 to 0.4 times.

According to the present technology, preferably the raised bottom portion disposed on an end portion of the sipe has a height of from 0.6 to 0.9 times the maximum depth x of the sipe. With the height of the raised bottom portion disposed on an end portion of the sipe thus set to an appropriate height, it is possible to improve block rigidity and improve steering stability performance on dry road surfaces. More preferably, the height is from 0.7 to 0.8 times.

According to the present technology, preferably the raised bottom portion has a height of from 0.3 to 0.7 times the sipe length. With the length of the raised bottom portion thus appropriately set, it is possible to improve block rigidity and improve steering stability performance on dry road surfaces.

Note that, in the present technology, "ground contact region" refers to the region in the tire lateral direction corresponding to a maximum linear distance (tire ground contact width) in the tire lateral direction of the ground contact surface formed on a flat plate after a tire is inflated to an air pressure corresponding to the maximum load capacity defined by standards (such as those of the Japan Automobile Tyre Manufacturers Association Inc. (JATMA), Tire and Rim Association, Inc. (TRA), or European Tyre and Rim Technical Organisation (ETRTO)), placed vertically on the flat plate in a static state, and loaded with a load corresponding to 80% of the maximum load capacity. Further, "groove area ratio of the chamfered portions and the sipes in the ground contact region on the vehicle mounting outer side" refers to a percentage (%) of a total area of the chamfered portions and the sipes included in the ground contact region on the vehicle mounting outer side of the tread portion with respect to the total area of the ground contact region on the vehicle mounting outer side of the tread portion, and the "groove area ratio of the chamfered portions and the sipes in the ground contact region on the vehicle mounting inner side" refers to a percentage (%) of a total area of the chamfered portions and the sipes included in the ground contact region on the vehicle mounting inner side of the tread portion with respect to the total area of the ground contact region on the vehicle mounting inner side of the tread portion. Furthermore, "groove area ratio in the ground contact region on the vehicle mounting outer side" refers to a percentage (%) of a total area of the groove portion included in the ground contact region on the vehicle mounting outer side of the tread portion with respect to the total area of the ground contact region on the vehicle mounting outer side of the tread portion, and the "groove area ratio in the ground contact region on the vehicle mounting inner side" refers to a percentage (%) of a total area of the groove portion included in the ground contact region on the vehicle mounting inner side of the tread portion with respect to the total area of the ground contact region on the vehicle mounting inner side of the tread portion.

DETAILED DESCRIPTION

Configurations of embodiments according to the present technology are described in detail below with reference to the accompanying drawings. Note that, in FIGS. 1 and 2, CL denotes a tire center line.

Figure 1:
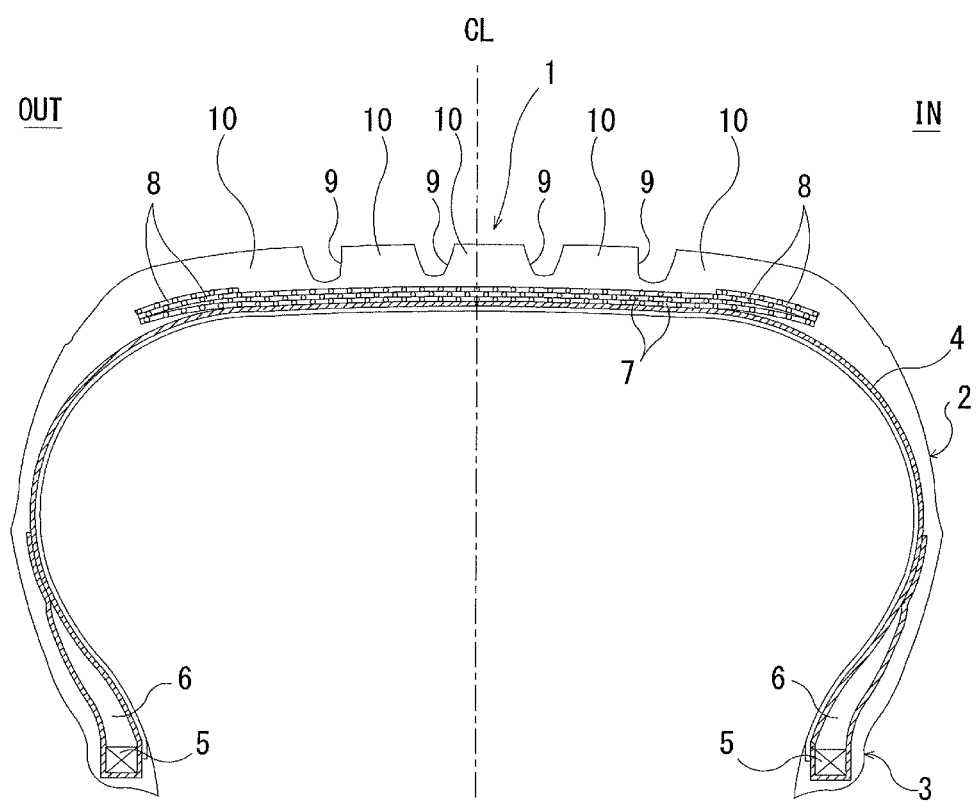
FIG. 1 is a meridian cross-sectional view illustrating a pneumatic tire according to an embodiment of the present technology.

As illustrated in FIG. 1, a pneumatic tire of an embodiment of the present technology has a designated mounting direction with respect to a vehicle. "IN" refers to a vehicle side inward of the tire center line CL when the tire is mounted on the vehicle (hereinafter referred to as "vehicle mounting inner side"), and "OUT" refers to a vehicle side outward of the tire center line CL when the tire is mounted on the vehicle (hereinafter referred to as "vehicle mounting outer side"). The pneumatic tire illustrated in FIG. 1 includes an annular tread portion 1 extending in a tire circumferential direction, a pair of sidewall portions 2, 2 disposed on both sides of the tread portion 1, and a pair of bead portions 3, 3 disposed inward of the sidewall portions 2 in a tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from a rubber composition is disposed on the outer circumference of the bead core 5.

A plurality of belt layers 7 are embedded on an outer circumferential side of the carcass layer 4 in the tread portion 1. These belt layers 7 include a plurality of reinforcing cords that are inclined with respect to the tire circumferential direction and the reinforcing cords are disposed so that the direction of the reinforcing cords of the different layers intersect each other. In the belt layers 7, an inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto.

Figure 2:
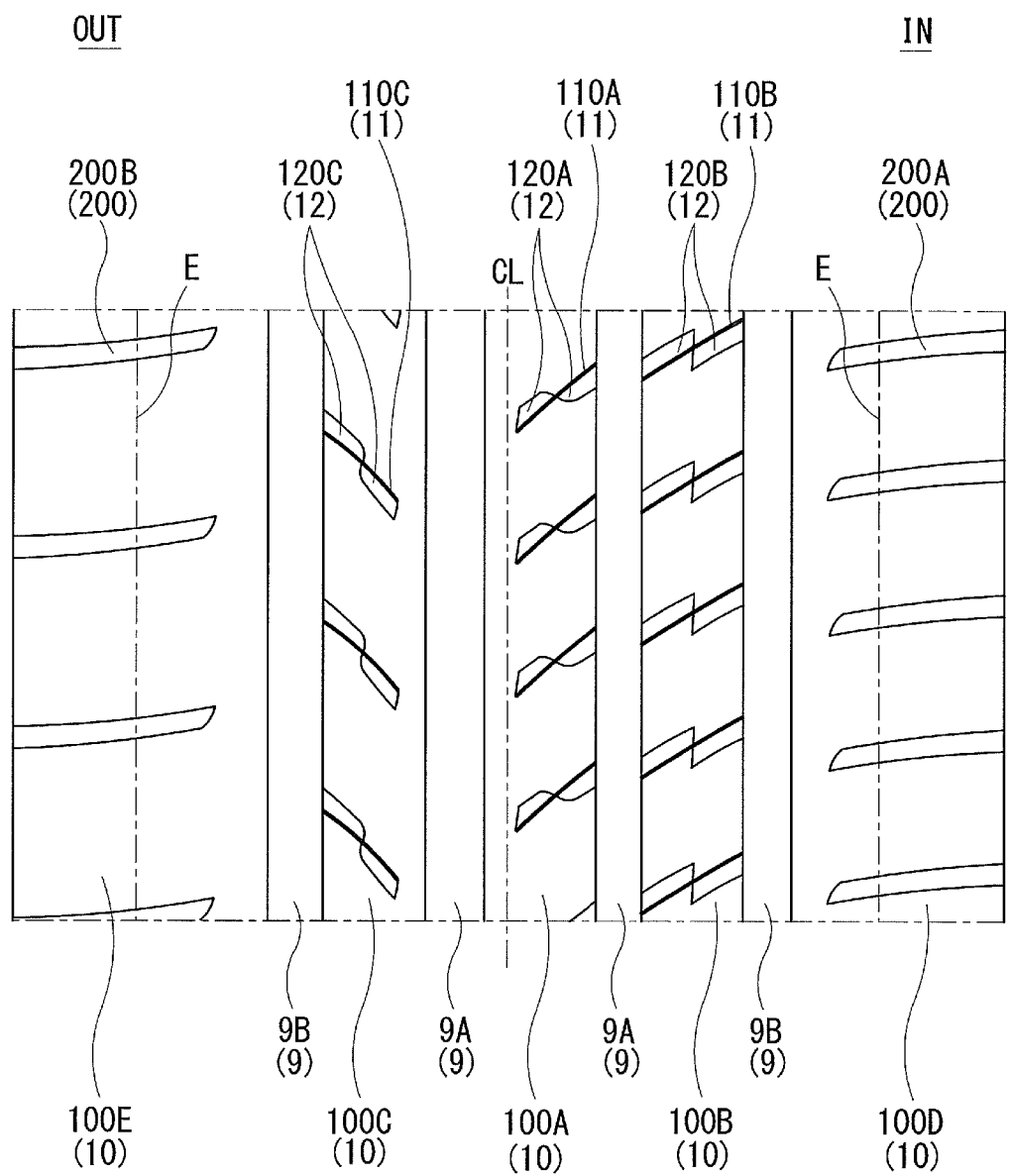
FIG. 2 is a plan view illustrating an example of a tread portion of the pneumatic tire according to an embodiment of the present technology.

FIG. 2 is a plan view illustrating an example of the tread portion 1, with E denoting a ground contact edge. Four main grooves 9 extending in the tire circumferential direction are formed in the tread portion 1. The main grooves 9 include a pair of inner main grooves 9A, 9A adjacent to the tire center line CL, and a pair of outer main grooves 9B, 9B positioned outermost in the tire lateral direction. Ribs 10 are defined in the tread portion 1 by these four main grooves 9. The ribs 10 include a center rib 100A positioned on the tire center line CL, a pair of intermediate ribs 100B, 100C positioned outward of the center rib 100A in the tire lateral direction, and a pair of shoulder ribs 100D, 100E positioned outward of the intermediate ribs 100B, 100C, respectively, in the tire lateral direction.

Sipes 11, each including a pair of chamfered portions 12, are formed in the center rib 100A and the intermediate ribs 100B, 100C. The sipes 11 include a sipe 110A disposed in the center rib 100A, and sipes 110B, 110C disposed in the intermediate ribs 100B, 100C, respectively. The chamfered portions 12 include a chamfered portion 120A formed in the sipe 110A, a chamfered portion 120B formed in the sipe 110B, and a chamfered portion 120C formed in the sipe 110C.

A plurality of the sipes 110A inclined in the same direction with respect to the tire lateral direction are formed at intervals in the tire circumferential direction in the center rib 100A. These sipes 110A communicate with the inner main groove 9A at a first end and terminate in the center rib 100A at a second end. That is, the sipe 110A is a semi-closed sipe.

A plurality of the sipes 110B inclined in the same direction with respect to the tire lateral direction are formed at intervals in the tire circumferential direction in the intermediate rib 100B. These sipes 110B communicate with the inner main groove 9A at a first end and communicate with the outer main groove 9B at a second end. That is, the sipe 110B is an open sipe. A plurality of the sipes 110C inclined in the same direction with respect to the tire lateral direction are formed at intervals in the tire circumferential direction in the intermediate rib 100C. These sipes 110C terminate in the intermediate rib 100C at a first end and communicate with the outer main groove 9B at a second end. That is, the sipe 110C is a semi-closed sipe.

A plurality of lug grooves 200 that extend in the tire lateral direction, are inclined in the same direction with respect to the tire lateral direction in the ground contact region, and are not in communication with the outer main groove 9B are formed at intervals in the tire circumferential direction in the shoulder ribs 100D, 100E. The lug grooves 200 include a lug groove 200A formed in the shoulder rib 100D, and a lug groove 200B formed in the shoulder rib 100E.

The total sum of the projected areas obtained by projecting, in the tire radial direction, the sipes 11 and the chamfered portions 12 included in the ground contact region on the vehicle mounting inner side is defined as a groove area $S_A$, and the total sum of the projected areas obtained by projecting, in the tire radial direction, the sipes 11 and the chamfered portions 12 included in the ground contact region on the vehicle mounting outer side is defined as a groove area $S_B$. That is, the groove area $S_A$ is the total sum of the groove areas of all sipes 110A, chamfered portions 120A, sipes 110B, and chamfered portions 120B positioned in a region enclosed by the tire center line CL and the ground contact edge E on the vehicle mounting inner side. On the other hand, the groove area $S_B$ is the total sum of the groove areas of all sipes 110C and chamfered portions 120C positioned in a region enclosed by the tire center line CL and the ground contact edge E on the vehicle mounting outer side. The groove area $S_A$ on the vehicle mounting inner side is greater than the groove area $S_B$ on the vehicle mounting outer side.

Figure 3:
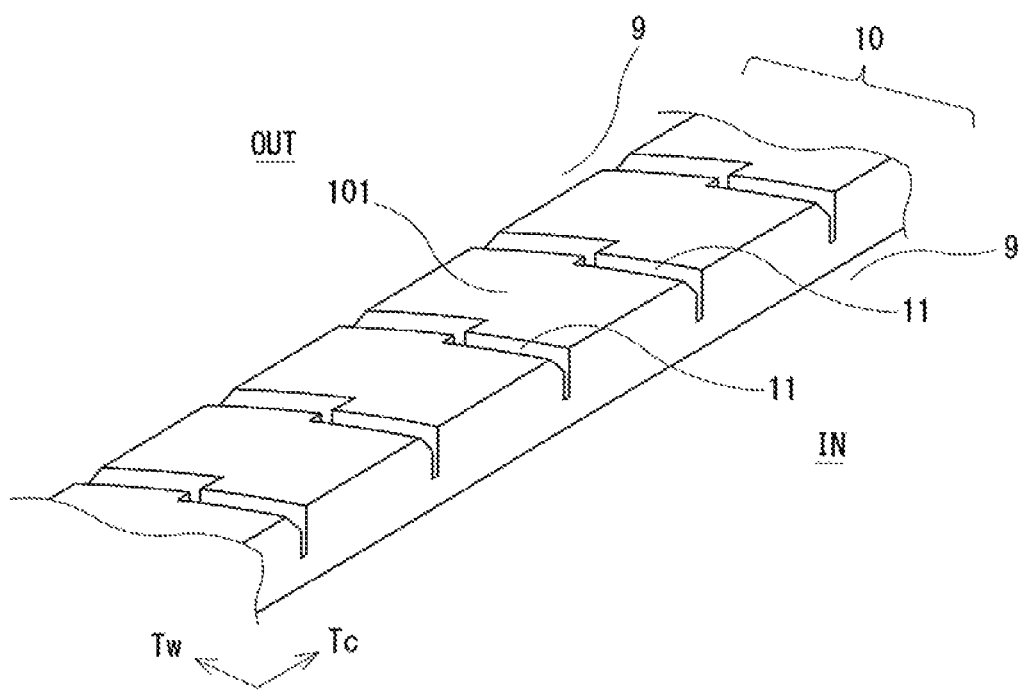
FIG. 3 is a perspective view illustrating a portion of the tread portion of the pneumatic tire according to the present technology.
Figure 4:
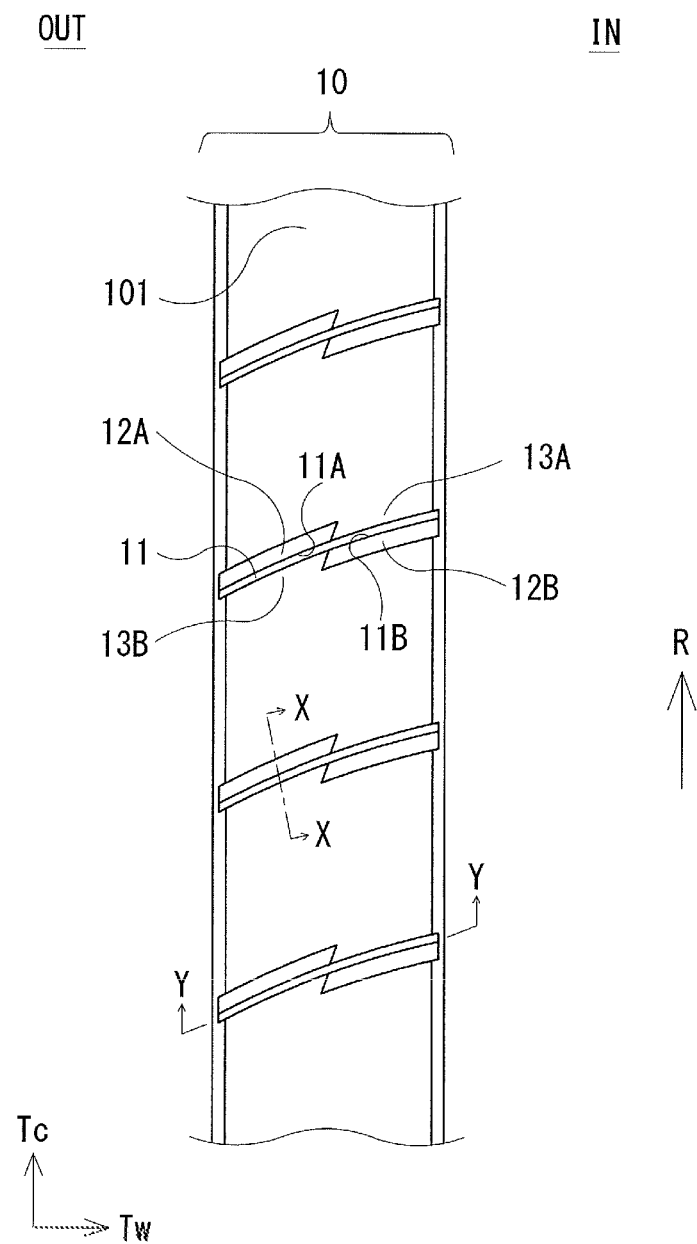
FIG. 4 is a plan view illustrating a portion of a tread portion of the pneumatic tire according to the present technology.
Figure 5:
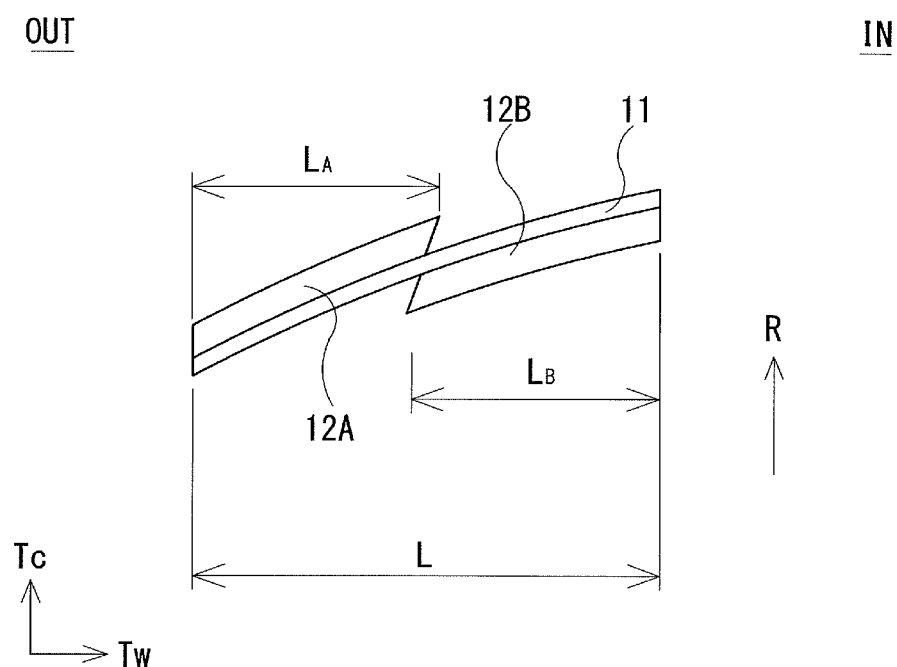
FIG. 5 is a plan view illustrating a sipe and chamfered portions thereof formed in the tread portion of FIG. 4.

FIGS. 3 to 5 each illustrate a portion of the tread portion 1, with Tc denoting the tire circumferential direction and Tw denoting the tire lateral direction. As illustrated in FIG. 3, the rib 10 includes the plurality of sipes 11 extending in the tire lateral direction, and blocks 101 defined by the plurality of sipes 11. The plurality of blocks 101 are disposed side-by-side in the tire circumferential direction. The sipes 11 are narrow grooves having a groove width of 1.5 mm or less.

As illustrated in FIG. 4, the sipes 11 each have an overall curved shape, and are formed at intervals in the rib 10 in the tire circumferential direction. Further, the sipes 11 each include an edge 11A on a leading side with respect to a rotation direction R, and an edge 11B on a trailing side with respect to the rotation direction R. The chamfered portion 12 is formed on both the leading-side edge 11A and the trailing-side edge 11B.

The chamfered portions 12 each include a chamfered portion 12A on the leading side with respect to the rotation direction R, and a chamfered portion 12B on the trailing side with respect to the rotation direction R. Non-chamfered regions 13 where other chamfered portions do not exist are disposed in areas opposite these chamfered portions 12. That is, there is a non-chamfered region 13B on the trailing side with respect to the rotation direction R in the area opposite the chamfered portion 12A, and there is a non-chamfered region 13A on the leading side with respect to the rotation direction R in the area opposite the chamfered portion 12B. The chamfered portion 12 and the non-chamfered region 13 where other chamfered portions do not exist are thus disposed to be adjacent on both the leading-side edge 11A and the trailing-side edge 11B of the sipe 11.

As illustrated in FIG. 5, in the sipe 11 and the chamfered portions 12A, 12B, the lengths in the tire lateral direction are defined as a sipe length L and chamfer lengths $L_A$, $L_B$, respectively. The sipe length L and the chamfer lengths $L_A$, $L_B$ are lengths in the tire lateral direction from a first end portion to a second end portion of the corresponding sipe 11 or chamfered portion 12A, 12B. The chamfer lengths $L_A$, $L_B$ of the chamfered portions 12A, 12B are both less than the sipe length L of the sipe 11.

Figure 6:
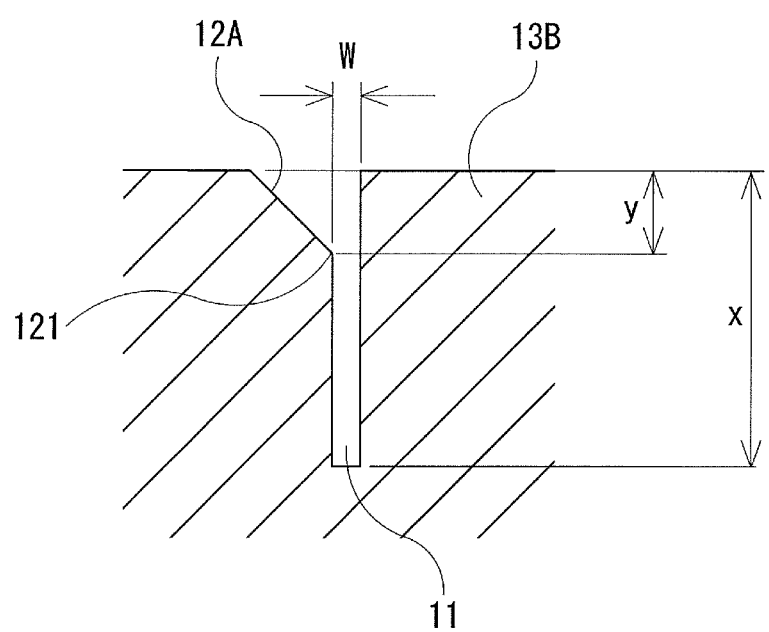
FIG. 6 is a cross-sectional view taken along the arrow line X-X of FIG. 4.

FIG. 6 is a vertically cut cross-sectional view of the tread portion 1, orthogonal to the sipe 11. As illustrated in FIG. 6, given x (mm) as a maximum depth of the sipe 11, and y (mm) as the maximum depth of the chamfered portion 12, the sipe 11 and the chamfered portion 12 are formed so that the maximum depth x (mm) and the maximum depth y (mm) satisfy the relationship of Formula (1) below. The maximum depth x of the sipe 11 is preferably from 3 mm to 8 mm. A sipe width W of the sipe 11 is substantially constant in a range from an end portion 121 positioned inward of the chamfered portion 12 in the tire radial direction to a groove bottom of the sipe 11. This sipe width W is a substantially measured width of the sipe 11 that, for example, does not include a height of a protrusion when a protrusion exists in a groove wall of the sipe 11, or does not include a narrowed portion when the width of the sipe 11 gradually narrows along the groove bottom.

$$x \times 0.1 \leq y \leq x \times 0.3 + 1.0 \quad (1)$$

In the pneumatic tire described above, the chamfered portions 12 shorter than the sipe length L of the sipe 11 are provided on the leading-side edge 11A and the trailing-side edge 11B of the sipe 11, and the non-chamfered regions 13 where other chamfered portions do not exist are disposed in the areas of the sipe 11 opposite the chamfered portions 12. This makes it possible to enhance the drainage effect on the basis of the chamfered portions 12 and, at the same time, effectively remove a water film by the edge effect by the non-chamfered regions 13 where the chamfered portions 12 are not provided. Therefore, it is possible to significantly improve steering stability performance on wet road surfaces. Moreover, with the chamfered portions 12 and the non-chamfered regions 13 where the chamfered portions 12 are not provided both existing on the leading-side edge 11A and the trailing-side edge 11B, it is possible to maximum such an effect of enhancing wet performance as described above during braking and driving. Further, the groove area $S_A$ of the chamfered portions 12 and the sipes 11 included in the ground contact region on the vehicle mounting inner side is greater than the groove area $S_B$ of the chamfered portions 12 and the sipes 11 included in the ground contact region on the vehicle mounting outer side, making it possible to more effectively improve steering stability performance on dry road surfaces and steering stability performance on wet road surfaces.

Further, according to the pneumatic tire described above, the maximum depth x (mm) and the maximum depth (y) mm need to satisfy the relationship of Formula (1) described above. With the sipe 11 and the chamfered portion 12 provided so as to satisfy the relationship of Formula (1) described above, a surface area to be chamfered can be minimized compared to that of the sipe chamfered in the related art, making it possible to improve steering stability performance on dry road surfaces. As a result, it is possible to improve steering stability performance on both dry road surfaces and wet road surfaces in a compatible manner. Here, when $y < x \times 0.1$, the drainage effect based on the chamfered portions 12 is inadequate. Further, conversely, when $y > x \times 0.3 + 1.0$, the rigidity of the rib 10 decreases, causing a decrease in steering stability performance on dry road surfaces. In particular, satisfying the relationship $y \leq x \times 0.3 + 0.5$ is preferred.

A groove area ratio of the chamfered portions 12 and the sipes 11 in the ground contact region on the vehicle mounting inner side is defined as $M1_A$, and a groove area ratio of the chamfered portions 12 and the sipes 11 in the ground contact region on the vehicle mounting outer side is defined as $M1_B$. The groove area ratio $M1_A$ of the chamfered portions 12 and the sipes 11 in the ground contact region on the vehicle mounting inner side is from 3 to 15% greater than the groove area ratio $M1_B$ of the chamfered portions 12 and the sipes 11 in the ground contact region on the vehicle mounting outer side. That is, the groove area ratio $M1_A$ is greater than the groove area ratio $M1_B$, and the difference between the groove area ratio $M1_A$ and the groove area ratio $M1_B$ is from 3 to 15%. In particular, the groove area ratio M1$_A$ is preferably from 5 to 10% greater than the groove area ratio M1$_B$. With the groove area ratio M1$_A$ appropriately set with respect to the groove area ratio M1$_B$, it is possible to effectively improve steering stability performance on both dry road surfaces and wet road surfaces in a compatible manner.

Further, a groove area ratio in the ground contact region on the vehicle mounting inner side is defined as M2$_A$, and a groove area ratio in the ground contact region on the vehicle mounting outer side is defined as M2$_B$. The groove area ratio M2$_A$ in the ground contact region on the vehicle mounting inner side is from 5 to 20% greater than the groove area ratio M2$_B$ in the ground contact region on the vehicle mounting outer side. That is, the groove area ratio M2$_A$ is greater than the groove area ratio M2$_B$, and the difference between the groove area ratio M2$_A$ and the groove area ratio M2$_B$ is from 5 to 20%. In particular, the groove area ratio M2$_A$ is preferably from 8 to 15% greater than the groove area ratio M2$_B$. With the groove area ratio M2$_A$ appropriately set with respect to the groove area ratio M2$_B$, it is possible to effectively improve steering stability performance on both dry road surfaces and wet road surfaces in a compatible manner.

Furthermore, a pitch count of groove elements extending in the tire lateral direction in the ground contact region on the vehicle mounting inner side, that is, of the sipe 110A, the sipe 110B, and the lug groove 200A, is defined as P$_A$, and a pitch count of groove elements extending in the tire lateral direction in the ground contact region on the vehicle mounting outer side, that is, of the sipe 110C and the lug groove 200B, is defined as P$_B$. The pitch count P$_A$ of the groove elements extending in the tire lateral direction in the ground contact region on the vehicle mounting inner side is greater than the pitch count P$_B$ of the groove elements extending in the tire lateral direction in the ground contact region on the vehicle mounting outer side. With the pitch count P$_A$ thus set greater than the pitch count P$_B$, a size of the block on the vehicle mounting outer side can be increased, making it possible to effectively improve steering stability performance on dry road surfaces.

In particular, the pitch count P$_B$ is preferably from 0.5 to 0.9 times, more preferably from 0.6 to 0.8 times, the pitch count P$_A$. With the pitch count P$_B$ appropriately set with respect to the pitch count P$_A$, it is possible to effectively improve steering stability performance on both dry road surfaces and wet road surfaces in a compatible manner.

Figure 7:
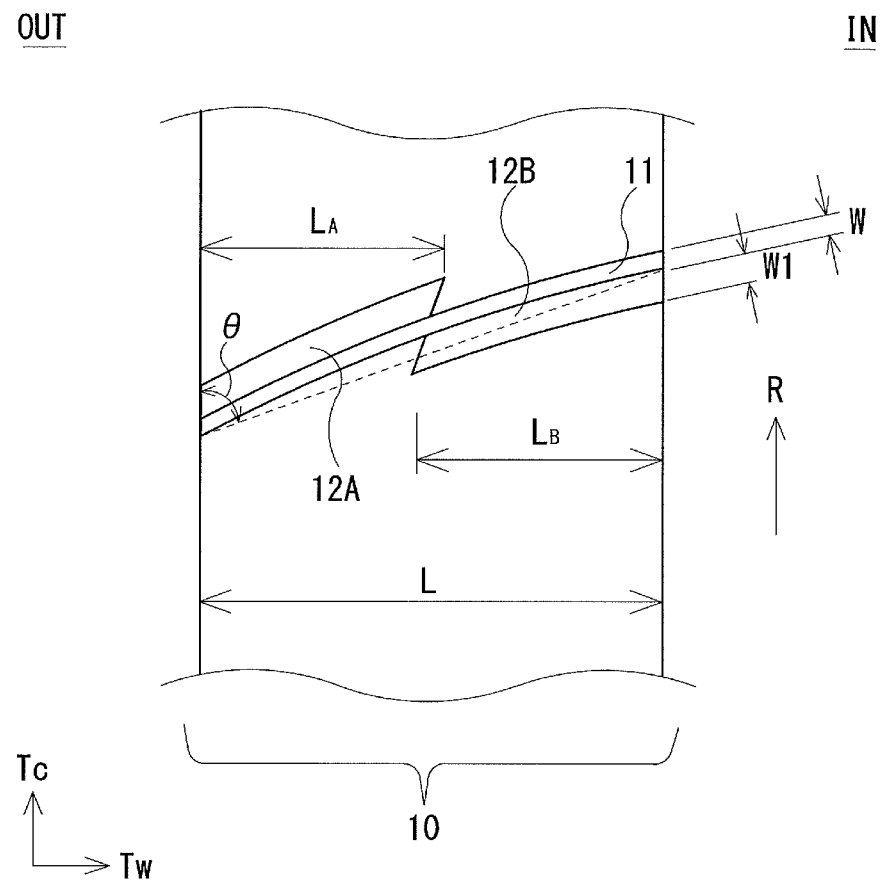
FIG. 7 is a plan view illustrating the sipe and the chamfered portions thereof formed in the tread portion of the pneumatic tire according to the present technology.

The sipe 11 is formed so as to have an inclination angle θ with respect to the tire circumferential direction, as illustrated in FIG. 7. This inclination angle θ refers to an angle formed by an imaginary line (the dotted line illustrated in FIG. 7) that connects both end portions of the sipe 11 and a side surface of the block 101, and includes an inclination angle on an obtuse angle side and an inclination angle on an acute angle side. FIG. 7 illustrates the inclination angle θ on the acute angle side. Further, the inclination angle θ is for the inclination angle θ of the sipe 11 at an intermediate pitch in the rib 10. The inclination angle θ on the acute angle side is preferably from 40° to 80°, more preferably from 50° to 70°. With the sipe 11 thus inclined with respect to the tire circumferential direction, it is possible to improve pattern rigidity and further improve steering stability performance on dry road surfaces. Here, when the inclination angle θ is less than 40°, uneven wear resistance performance deteriorates. Further, when the inclination angle θ exceeds 80°, pattern rigidity cannot be adequately improved.

According to the present technology, the side having an inclination angle θ on the acute angle side of the sipe 11 is defined as the acute angle side, and the side having the inclination angle θ on the obtuse angle side of the sipe 11 is defined as the obtuse angle side. The chamfered portions 12A, 12B formed on the edges 11A, 11B of the sipe 11, respectively, are formed on the acute angle side of the sipe 11. With chamfering thus executed on the acute angle side of the sipe 11, it is possible to further enhance uneven wear resistance performance. Or, the chamfered portions 12A, 12B may be formed on the obtuse angle side of the sipe 11. With the chamfered portions 12A, 12B thus formed on the obtuse angle side, it is possible to increase the edge effect and further improve steering stability performance on wet road surfaces.

According to the present technology, while steering stability performance on wet road surfaces can be improved by forming the sipe 11 described above into an overall curved shape, the sipe 11 may have a shape that partially curves or bends in a plan view. With the sipe 11 thus formed, a total amount of the edges 11A, 11B of each sipe 11 increases, making it possible to improve steering stability performance on wet road surfaces.

The end portions of the chamfered portions 12A, 12B positioned close to the main grooves 9 respectively communicate with the main grooves 9 positioned on both sides of the rib 10, as illustrated in FIG. 7. With the chamfered portions 12A, 12B thus formed, it is possible to further improve steering stability performance on wet road surfaces. Or, the end portions of the chamfered portions 12A, 12B close to the main grooves 9 may terminate in the rib 10 without communicating with the main grooves 9. With the chamfered portions 12A, 12B thus formed, it is possible to further improve steering stability performance on dry road surfaces.

The chamfered portion 12, as illustrated in FIG. 7, is disposed in one location on the leading-side edge 11A and one location on the trailing-side edge 11B of the sipe 11. With the chamfered portions 12 thus arranged, it is possible to improve uneven wear resistance performance. When the chamfered portion 12 is formed in two or more locations on the leading-side edge 11A and the trailing-side edge 11B of the sipe 12, respectively, the number of joints increases, resulting in the tendency of deterioration of uneven wear resistance performance.

Further, a maximum value of the width of the chamfered portion 12 measured in a direction orthogonal to the sipe 11 is defined as a width W1. The maximum width W1 of the chamfered portion 12 is preferably from 0.8 to 5.0 times, more preferably from 1.2 to 3.0 times, the sipe width W of the sipe 11. With the maximum width W1 of the chamfered portion 12 thus appropriately set with respect to the sipe width W, it is possible to improve steering stability performance on both dry road surfaces and wet road surfaces in a compatible manner. Here, when the maximum width W1 of the chamfered portion 12 is less than 0.8 times the sipe width W of the sipe 11, the improvement in steering stability performance on wet road surfaces is inadequate. Further, when the maximum width W1 of the chamfered portion 12 is greater than 5.0 times the sipe width W of the sipe 11, the improvement in steering stability performance on dry road surfaces is inadequate.

Furthermore, an outer edge portion of the chamfered portion 12 in a longitudinal direction is formed parallel with the extension direction of the sipe 11. With the chamfered portion 12 thus extended in parallel with the sipe 11, it is possible to improve uneven wear resistance performance, and improve steering stability performance on both dry road surfaces and wet road surfaces in a compatible manner.

Figure 8A:
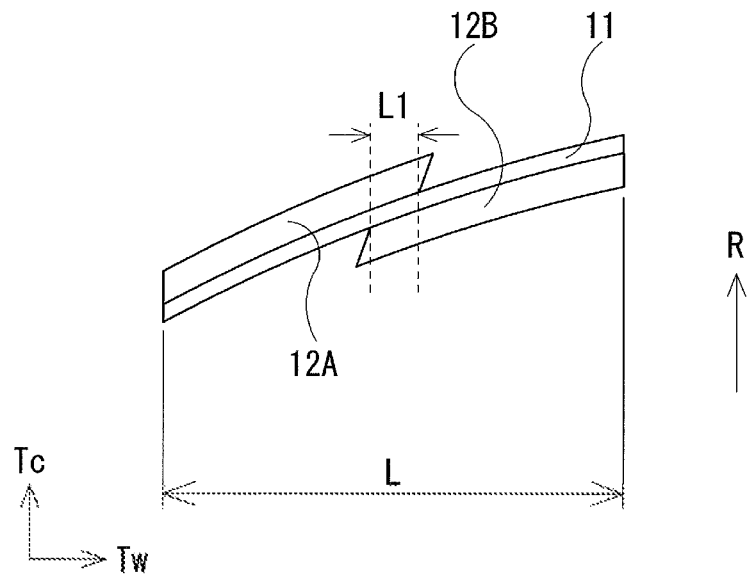
FIGS. 8A and 8B illustrate modified examples of the sipe and the chamfered portions thereof of the pneumatic tire according to the present technology, each as a plan view of the corresponding modified example.
Figure 8B:
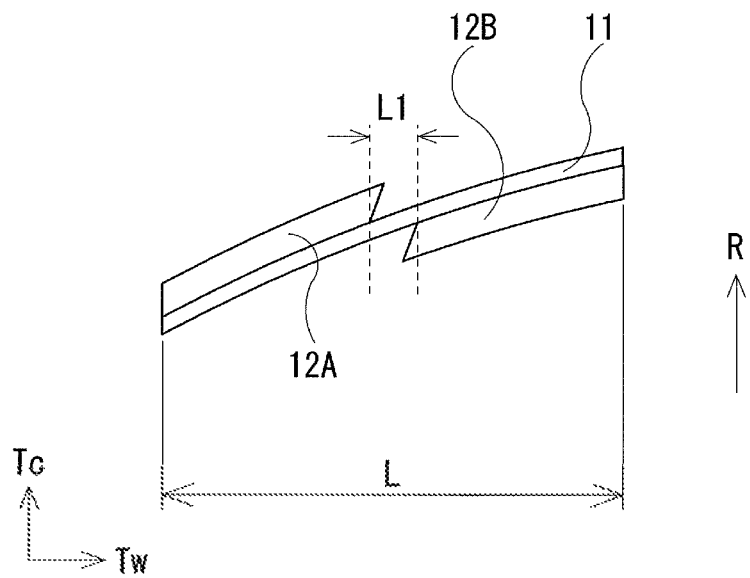

The chamfered portion 12A and the chamfered portion 12B, as illustrated in FIG. 8A, are formed so as to partially overlap in a central portion of the sipe 11. Here, a length in the tire lateral direction of an overlapping portion, which is the portion where the chamfered portion 12 overlaps with the chamfered portion 12A, is defined as an overlap length L1. On the other hand, as illustrated in FIG. 8B, when the chamfered portion 12A and the chamfered portion 12B do not partially overlap and are separated by a constant interval, a ratio of the overlap length L1 to the sipe length L is expressed as a negative value. The overlap length L1 of the overlapping portion is preferably from −30 to 30%, more preferably from −15% to 15%, of the sipe length L. With the overlap length L1 of the chamfered portions 12A, 12B thus appropriately set with respect to the sipe length L, it is possible to improve steering stability performance on both dry road surfaces and wet road surfaces in a compatible manner. Here, when the overlap length L1 is greater than 30%, the improvement in steering stability performance on dry road surfaces is inadequate. Further, when the overlap length L1 is less than −30%, the improvement in steering stability performance on wet road surfaces is inadequate.

Figure 9:
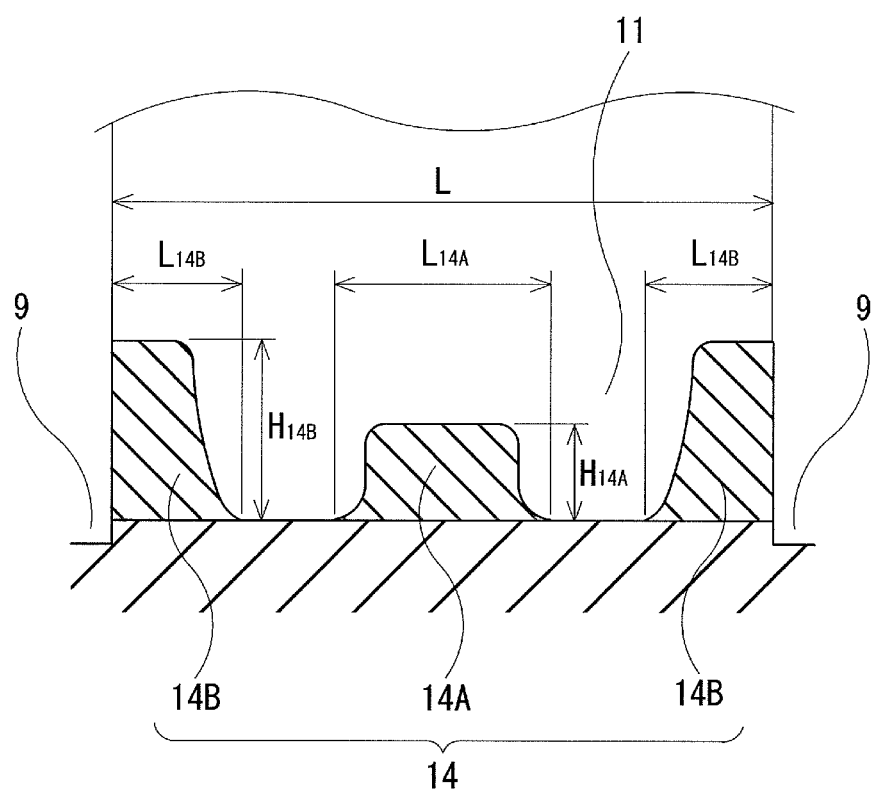
FIG. 9 is a cross-sectional view taken along the arrow line Y-Y of FIG. 4.

As illustrated in FIG. 9, the sipe 11 further includes raised bottom portions 14 on portions thereof in the length direction. As the raised bottom portions 14, there exists a raised bottom portion 14A positioned in a central portion of the sipe 11 and a raised bottom portion 14B positioned at both end portions of the sipe 11. With the raised bottom portions 14 thus provided to the sipe 11, it is possible to improve steering stability performance on both dry road surfaces and wet road surfaces in a compatible manner. The raised bottom portions 14 of the sipe 11 may be formed on an end portion of the sipe 11 and/or an area other than the end portion.

In the raised bottom portion 14A formed in an area other than an end portion of the sipe 11, a maximum value of a height from the groove bottom of the sipe 11 to an upper surface of the raised bottom portion 14A is defined as a height $H_{14A}$. This height $H_{14A}$ is preferably from 0.2 to 0.5 times, more preferably from 0.3 to 0.4 times, the maximum depth x of the sipe 11. With the height $H_{14A}$ of the raised bottom portion 14A disposed in an area other than an end portion of the sipe 11 thus set to an appropriate height, it is possible to improve the rigidity of the block 101 and maintain the drainage effect, making it possible to improve steering stability performance on wet road surfaces. Here, when the height $H_{14A}$ is less than 0.2 times the maximum depth x of the sipe 11, the rigidity of the block 101 cannot be adequately improved. Further, when the height $H_{14A}$ is greater than 0.5 times the maximum depth x of the sipe 11, steering stability performance on wet road surfaces cannot be adequately improved.

In the raised bottom portion 14B formed in both end portions of the sipe 11, a maximum value of a height from the groove bottom of the sipe 11 to an upper surface of the raised bottom portion 14B is defined as a height $H_{14B}$. This height $H_{14B}$ is preferably from 0.6 to 0.9 times, more preferably from 0.7 to 0.8 times, the maximum depth x of the sipe 11. With the height $H_{14B}$ of the raised bottom portion 14B formed on the end portions of the sipe 11 thus set to an appropriate height, it is possible to improve the rigidity of the block 101 and improve steering stability performance on dry road surfaces. Here, when the height $H_{14B}$ is less than 0.6 times the maximum depth x of the sipe 11, the rigidity of the block 101 cannot be adequately improved. Further, when the height $H_{14B}$ is greater than 0.9 times the maximum depth x of the sipe 11, steering stability performance on wet road surfaces cannot be adequately improved.

Further, in the raised bottom portions 14A, 14B of the sipe 11, projected lengths in the tire lateral direction are defined as lengths $L_{14A}$, $L_{14B}$. The total sum of the lengths $L_{14A}$, $L_{14B}$ of the respective raised bottom portions 14A, 14B is defined as a length $L_{14}$ of the raised bottom portions 14. The length $L_{14}$ of this raised bottom portion 14 is preferably from 0.3 to 0.7 times, more preferably from 0.4 to 0.6 times, the sipe length L. With the length $L_{14}$ of the raised bottom portions 14 thus appropriately set, it is possible to improve steering stability performance on both dry road surfaces and wet road surfaces in a compatible manner. Here, when the length $L_{14}$ of the raised bottom portions 14 is less than 0.3 times the sipe length L of the sipe 11, the rigidity of the block 101 cannot be adequately improved. Further, when the length $L_{14}$ is greater than 0.7 times the sipe length L of the sipe 11, steering stability performance on wet road surfaces cannot be adequately improved.

Figure 10A:
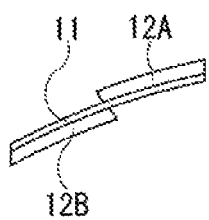
FIGS. 10A to 10E illustrate other modified examples of the sipe and the chamfered portions thereof of the pneumatic tire according to the present technology, each as a plan view of the corresponding modified example.
Figure 10B:
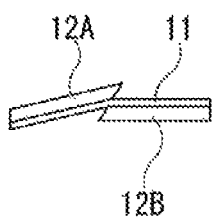
Figure 10C:
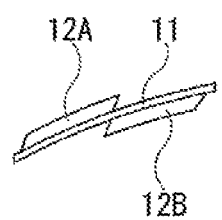
Figure 10D:
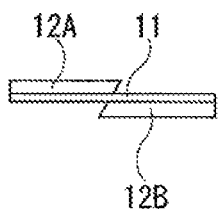
Figure 10E:
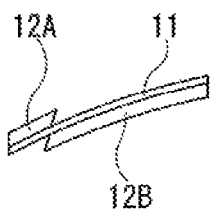

Examples of the chamfered portions 12A, 12B of the sipe 11 include those illustrated in FIGS. 2 to 5, 7, 8A, and 8B as well as when the obtuse angle side of the sipe 11 is chamfered as illustrated in FIG. 10A, when a portion of the sipe 11 is bent as illustrated in FIG. 10B, and when end portions of the chamfered portions 12A, 12B positioned close to the main grooves 9 terminate in the rib 10 rather than open to the main grooves 9 as illustrated in FIG. 10C. Further, examples also include when the sipe 11 and the chamfered portions 12A, 12B are formed in parallel with the tire lateral direction as illustrated in FIG. 10D, and when a boundary line in the tire lateral direction between the chamfered portion 12A and the chamfered portion 12B is significantly shifted from the center of the sipe 11 as illustrated in FIG. 10E.

Note that, while a sipe 110A and a chamfered portion 120A are not disposed on the tire center line CL in the embodiment (FIG. 2) described above, when the sipe 110A or the chamfered portion 120A is disposed on the tire center line CL, the groove areas $S_A$, $S_B$, the groove area ratios $M1_A$, $M1_B$, and the groove area ratios $M2_A$, $M2_B$ are each specified for each portion positioned on the vehicle mounting inner side or the vehicle mounting outer side of the sipe 110A or the chamfered portion 120A.

EXAMPLES

Using pneumatic tires having a tire size of 245/40R19, Conventional Examples 1 and 2, Comparative Examples 1 and 2, and Examples 1 to 19 were prepared. Each of these pneumatic tires includes a plurality of the main grooves extending in the tire circumferential direction in the tread portion, and sipes extending in the tire lateral direction in the ribs defined by the main grooves; and has a designated mounting direction on the vehicle and an asymmetrical tread pattern on both sides of the tire center line. In each pneumatic tire, the arrangement of the chamfer (both sides or one side), the length relationship between the sipe length L and the chamfer lengths $L_A$, $L_B$, the absence/presence of a chamfer in the area opposite the chamfered portion, the maximum depth x (mm) of the sipe, the maximum depth y (mm) of the chamfered portion, the size relationship between the groove area $S_A$ of the chamfered portions and sipes on the vehicle inner side and the groove area $S_B$ of the chamfered portions and sipes on the vehicle outer side, the inclination angle of the sipe on the acute angle side with respect to the tire circumferential direction, the chamfered location (obtuse angle side or acute angle side) of the sipe, the shape (linear or curved) of the sipe overall, the absence/presence of an opening in the chamfered portion to the main groove, the ratio of the overlap length L1 of the chamfered portions to the sipe length L, the number of chamfered locations (1 or 2), the maximum width W1 of the chamfered portion with respect to the sipe width W (W1/W), the chamfering shape (parallel or not parallel), the absence/presence of a raised bottom portion of the sipe (center, end portion, or none), the height $H_{14}$ of the raised bottom portion of the sipe with respect to the maximum depth x of the sipe ($H_{14}$/x), the length $L_{14}$ of the raised bottom portion with respect to the sipe length L ($L_{14}$/L), the difference between the groove area ratio MIA of the chamfered portions and the sipes on the vehicle inner side and the groove area ratio $M1_B$ of the chamfered portions and the sipes on the vehicle outer side ($M1_A$–$M1_B$), the difference between the groove area ratio $M2_A$ on the vehicle inner side and the groove area ratio $M2_B$ on the vehicle outer side ($M2_A$–$M2_B$), the size relationship between the pitch count $P_A$ on the vehicle inner side and the pitch count $P_B$ on the vehicle outer side, and the pitch count $P_B$ on the vehicle outer side with respect to the pitch count $P_A$ on the vehicle inner side ($P_B$/$P_A$) were set as shown in Tables 1 and 2.

Note that in the tires of Conventional Example 1, Comparative Examples 1 and 2, and Examples 1 to 19, the sipe width is constant in the range from the end portion positioned inward of the chamfered portion in the tire radial direction to the groove bottom of the sipe.

In these test tires, a sensory evaluation related to steering stability performance on dry road surfaces and steering stability performance on wet road surfaces by a test driver as well as a visual evaluation related to uneven wear resistance performance were conducted, and the results are shown in Tables 1 and 2.

The sensory evaluation related to steering stability performance on dry road surfaces and steering stability performance on wet road surfaces was conducted upon assembly of each test tire to a wheel having a 19×8.5 J rim size, with an air pressure of 260 kPA. Evaluation results are expressed as index values, with the results of Conventional Example 1 being assigned an index value of 100. Larger index values indicate superior steering stability performance on dry road surfaces and steering stability performance on wet road surfaces.

The sensory evaluation related to uneven wear resistance performance was conducted by assembling each test tire to a wheel having a 19×8.5 J rim size, running the test tire 4000 km under an air pressure of 260 kPA, and visually evaluating the outer appearance of the tire. Evaluation results are expressed as index values, with the results of Conventional Example 1 being assigned an index value of 100. Larger index values indicate superior uneven wear resistance performance.

TABLE 1

|  | Conventional Example 1 | Conventional Example 2 | Comparative Example 1 | Comparative Example 2 |
|---|---|---|---|---|
| Arrangement of chamfer (both sides or one side) | Both sides | One side | Both sides | Both sides |
| Length relationship between sipe length L and chamfer lengths $L_A$, $L_B$ | L = $L_A$, $L_B$ | L = $L_A$ | L > $L_A$, $L_B$ | L > $L_A$, $L_B$ |
| Chamfer in area opposite chamfered portion? | Yes | No | No | No |
| Maximum depth x of sipe (mm) | 6 mm | 6 mm | 6 mm | 6 mm |
| Maximum depth y of chamfered portion (mm) | 2 mm | 5 mm | 0.3 mm | 4 mm |
| Size relationship between groove area $S_A$ of chamfered portions and sipes on vehicle inner side and groove area $S_B$ of chamfered portions and sipes on vehicle outer side | $S_A = S_B$ | $S_A = S_B$ | $S_A > S_B$ | $S_A > S_B$ |
| Inclination angle of sipe on acute angle side with respect to tire circumferential direction | 90° | 90° | 90° | 90° |
| Chamfered location of sipe (obtuse angle side or acute angle side) | Obtuse angle side | Obtuse angle side | Obtuse angle side | Obtuse angle side |
| Shape of sipe overall (linear or curved) | Linear | Linear | Linear | Linear |
| Opening of chamfered portion to main groove? | Yes | Yes | Yes | Yes |
| Ratio of overlap length L1 of chamfered portions to sipe length L | — | — | 0% | 0% |
| Number of chamfered locations (1 or 2) | 1 | 1 | 1 | 1 |
| Maximum width W1 of chamfered portion to sipe width W (W1/W) | 0.5x | 0.5x | 0.5x | 0.5x |
| Chamfering shape (parallel or not parallel) | Parallel | Parallel | Parallel | Parallel |
| Raised bottom portion of sipe? (center, end portion, or no) | No | No | No | No |
| Height $H_{14}$ of raised bottom portion of sipe to maximum depth x of sipe ($H_{14}$/x) | — | — | — | — |
| Length $L_{14}$ of raised bottom portion to sipe length L ($L_{14}$/L) | — | — | — | — |

TABLE 1-continued

|  |  |  |  |  |
|---|---|---|---|---|
| Difference between groove area ratio $M1_A$ of chamfered portions and sipes on vehicle inner side and groove area ratio $M1_B$ of chamfered portions and sipes on vehicle outer side ($M1_A - M1_B$) | — | — | 2% | 2% |
| Difference between groove area ratio $M2_A$ on vehicle inner side and groove area ratio $M2_B$ on vehicle outer side ($M2_A - M2_B$) | — | — | 3% | 3% |
| Size relationship between pitch count $P_A$ on vehicle inner side and pitch count $P_B$ on vehicle outer side | — | — | $P_A = P_B$ | $P_A = P_B$ |
| Pitch count $P_B$ on vehicle outer side with respect to pitch count $P_A$ on vehicle inner side ($P_B/P_A$) | — | — | 1x | 1x |
| Steering stability performance on dry road surfaces | 100 | 90 | 103 | 98 |
| Steering stability performance on wet road surfaces | 100 | 105 | 98 | 103 |
| Uneven wear resistance performance | 100 | 100 | 100 | 100 |

|  | Example 1 | Example 2 | Example 3 | Example 4 |
|---|---|---|---|---|
| Arrangement of chamfer (both sides or one side) | Both sides | Both sides | Both sides | Both sides |
| Length relationship between sipe length L and chamfer lengths $L_A$, $L_B$ | $L > L_A, L_B$ | $L > L_A, L_B$ | $L > L_A, L_B$ | $L > L_A, L_B$ |
| Chamfer in area opposite chamfered portion? | No | No | No | No |
| Maximum depth x of sipe (mm) | 6 mm | 6 mm | 6 mm | 6 mm |
| Maximum depth y of chamfered portion (mm) | 2 mm | 2 mm | 2 mm | 2 mm |
| Size relationship between groove area $S_A$ of chamfered portions and sipes on vehicle inner side and groove area $S_B$ of chamfered portions and sipes on vehicle outer side | $S_A > S_B$ | $S_A > S_B$ | $S_A > S_B$ | $S_A > S_B$ |
| Inclination angle of sipe on acute angle side with respect to tire circumferential direction | 90° | 85° | 60° | 60° |
| Chamfered location of sipe (obtuse angle side or acute angle side) | Obtuse angle side | Obtuse angle side | Obtuse angle side | Acute angle side |
| Shape of sipe overall (linear or curved) | Linear | Linear | Linear | Linear |
| Opening of chamfered portion to main groove? | Yes | Yes | Yes | Yes |
| Ratio of overlap length L1 of chamfered portions to sipe length L | 0% | 0% | 0% | 0% |
| Number of chamfered locations (1 or 2) | 1 | 1 | 1 | 1 |
| Maximum width W1 of chamfered portion to sipe width W (W1/W) | 0.5x | 0.5x | 0.5x | 0.5x |
| Chamfering shape (parallel or not parallel) | Parallel | Parallel | Parallel | Parallel |
| Raised bottom portion of sipe? (center, end portion, or no) | No | No | No | No |
| Height $H_{14}$ of raised bottom portion of sipe to maximum depth x of sipe ($H_{14}/x$) | — | — | — | — |
| Length $L_{14}$ of raised bottom portion to sipe length L ($L_{14}/L$) | — | — | — | — |
| Difference between groove area ratio $M1_A$ of chamfered portions and sipes on vehicle inner side and groove area ratio $M1_B$ of chamfered portions and sipes on vehicle outer side ($M1_A - M1_B$) | 2% | 2% | 2% | 2% |
| Difference between groove area ratio $M2_A$ on vehicle inner side and groove area ratio $M2_B$ on vehicle outer side ($M2_A - M2_B$) | 3% | 3% | 3% | 3% |

TABLE 1-continued

|  | | | | |
|---|---|---|---|---|
| Size relationship between pitch count $P_A$ on vehicle inner side and pitch count $P_B$ on vehicle outer side | $P_A = P_B$ | $P_A = P_B$ | $P_A = P_B$ | $P_A = P_B$ |
| Pitch count $P_B$ on vehicle outer side with respect to pitch count $P_A$ on vehicle inner side ($P_B/P_A$) | 1x | 1x | 1x | 1x |
| Steering stability performance on dry road surfaces | 103 | 104 | 105 | 105 |
| Steering stability performance on wet road surfaces | 103 | 103 | 103 | 102 |
| Uneven wear resistance performance | 104 | 104 | 104 | 107 |

|  | Example 5 | Example 6 | Example 7 | Example 8 |
|---|---|---|---|---|
| Arrangement of chamfer (both sides or one side) | Both sides | Both sides | Both sides | Both sides |
| Length relationship between sipe length L and chamfer lengths $L_A$, $L_B$ | $L > L_A, L_B$ | $L > L_A, L_B$ | $L > L_A, L_B$ | $L > L_A, L_B$ |
| Chamfer in area opposite chamfered portion? | No | No | No | No |
| Maximum depth x of sipe (mm) | 6 mm | 6 mm | 6 mm | 6 mm |
| Maximum depth y of chamfered portion (mm) | 2 mm | 2 mm | 2 mm | 2 mm |
| Size relationship between groove area $S_A$ of chamfered portions and sipes on vehicle inner side and groove area $S_B$ of chamfered portions and sipes on vehicle outer side | $S_A > S_B$ | $S_A > S_B$ | $S_A > S_B$ | $S_A > S_B$ |
| Inclination angle of sipe on acute angle side with respect to tire circumferential direction | 60° | 60° | 60° | 60° |
| Chamfered location of sipe (obtuse angle side or acute angle side) | Acute angle side | Acute angle side | Acute angle side | Acute angle side |
| Shape of sipe overall (linear or curved) | Curved | Curved | Curved | Curved |
| Opening of chamfered portion to main groove? | Yes | No | Yes | Yes |
| Ratio of overlap length L1 of chamfered portions to sipe length L | 0% | 0% | 10% | −10% |
| Number of chamfered locations (1 or 2) | 1 | 1 | 1 | 1 |
| Maximum width W1 of chamfered portion to sipe width W (W1/W) | 0.5x | 0.5x | 0.5x | 0.5x |
| Chamfering shape (parallel or not parallel) | Parallel | Parallel | Parallel | Parallel |
| Raised bottom portion of sipe? (center, end portion, or no) | No | No | No | No |
| Height $H_{14}$ of raised bottom portion of sipe to maximum depth x of sipe ($H_{14}/x$) | — | — | — | — |
| Length $L_{14}$ of raised bottom portion to sipe length L ($L_{14}/L$) | — | — | — | — |
| Difference between groove area ratio $M1_A$ of chamfered portions and sipes on vehicle inner side and groove area ratio $M1_B$ of chamfered portions and sipes on vehicle outer side ($M1_A - M1_B$) | 2% | 2% | 2% | 2% |
| Difference between groove area ratio $M2_A$ on vehicle inner side and groove area ratio $M2_B$ on vehicle outer side ($M2_A - M2_B$) | 3% | 3% | 3% | 3% |
| Size relationship between pitch count $P_A$ on vehicle inner side and pitch count $P_B$ on vehicle outer side | $P_A = P_B$ | $P_A = P_B$ | $P_A = P_B$ | $P_A = P_B$ |
| Pitch count $P_B$ on vehicle outer side with respect to pitch count $P_A$ on vehicle inner side ($P_B/P_A$) | 1x | 1x | 1x | 1x |
| Steering stability performance on dry road surfaces | 105 | 106 | 105 | 107 |
| Steering stability performance on wet road surfaces | 105 | 104 | 105 | 103 |

TABLE 1-continued

| | | | | |
|---|---|---|---|---|
| Uneven wear resistance performance | 107 | 107 | 107 | 107 |

TABLE 2

| | Example 9 | Example 10 | Example 11 | Example 12 |
|---|---|---|---|---|
| Arrangement of chamfer (both sides or one side) | Both sides | Both sides | Both sides | Both sides |
| Length relationship between sipe length L and chamfer lengths $L_A$, $L_B$ | $L > L_A, L_B$ | $L > L_A, L_B$ | $L > L_A, L_B$ | $L > L_A, L_B$ |
| Chamfer in area opposite chamfered portion? | No | No | No | No |
| Maximum depth x of sipe (mm) | 6 mm | 6 mm | 6 mm | 6 mm |
| Maximum depth y of chamfered portion (mm) | 2 mm | 2 mm | 2 mm | 2 mm |
| Size relationship between groove area $S_A$ of chamfered portions and sipes on vehicle inner side and groove area $S_B$ of chamfered portions and sipes on vehicle outer side | $S_A > S_B$ | $S_A > S_B$ | $S_A > S_B$ | $S_A > S_B$ |
| Inclination angle of sipe on acute angle side with respect to tire circumferential direction | 60° | 60° | 60° | 60° |
| Chamfered location of sipe (obtuse angle side or acute angle side) | Acute angle side | Acute angle side | Acute angle side | Acute angle side |
| Shape of sipe overall (linear or curved) | Curved | Curved | Curved | Curved |
| Opening of chamfered portion to main groove? | Yes | Yes | Yes | Yes |
| Ratio of overlap length L1 of chamfered portions to sipe length L | 0% | 0% | 0% | 0% |
| Number of chamfered locations (1 or 2) | 2 | 1 | 1 | 1 |
| Maximum width W1 of chamfered portion to sipe width W (W1/W) | 0.5x | 2x | 2x | 2x |
| Chamfering shape (parallel or not parallel) | Parallel | Parallel | Not parallel | Parallel |
| Raised bottom portion of sipe? (center, end portion, or no) | No | No | No | Center |
| Height $H_{14}$ of raised bottom portion of sipe to maximum depth x of sipe ($H_{14}$/x) | — | — | — | 0.6x |
| Length $L_{14}$ of raised bottom portion to sipe length L ($L_{14}$/L) | — | — | — | 0.2x |
| Difference between groove area ratio $M1_A$ of chamfered portions and sipes on vehicle inner side and groove area ratio $M1_B$ of chamfered portions and sipes on vehicle outer side ($M1_A - M1_B$) | 2% | 2% | 2% | 2% |
| Difference between groove area ratio $M2_A$ on vehicle inner side and groove area ratio $M2_B$ on vehicle outer side ($M2_A - M2_B$) | 3% | 3% | 3% | 3% |
| Size relationship between pitch count $P_A$ on vehicle inner side and pitch count $P_B$ on vehicle outer side | $P_A = P_B$ | $P_A = P_B$ | $P_A = P_B$ | $P_A = P_B$ |
| Pitch count $P_B$ on vehicle outer side with respect to pitch count $P_A$ on vehicle inner side ($P_B/P_A$) | 1x | 1x | 1x | 1x |
| Steering stability performance on dry road surfaces | 106 | 106 | 106 | 110 |
| Steering stability performance on wet road surfaces | 104 | 106 | 106 | 105 |
| Uneven wear resistance performance | 105 | 109 | 106 | 109 |

TABLE 2-continued

|  | Example 13 | Example 14 | Example 15 | Example 16 |
|---|---|---|---|---|
| Arrangement of chamfer (both sides or one side) | Both sides | Both sides | Both sides | Both sides |
| Length relationship between sipe length L and chamfer lengths $L_A$, $L_B$ | $L > L_A, L_B$ | $L > L_A, L_B$ | $L > L_A, L_B$ | $L > L_A, L_B$ |
| Chamfer in area opposite chamfered portion? | No | No | No | No |
| Maximum depth x of sipe (mm) | 6 mm | 6 mm | 6 mm | 6 mm |
| Maximum depth y of chamfered portion (mm) | 2 mm | 2 mm | 2 mm | 2 mm |
| Size relationship between groove area $S_A$ of chamfered portions and sipes on vehicle inner side and groove area $S_B$ of chamfered portions and sipes on vehicle outer side | $S_A > S_B$ | $S_A > S_B$ | $S_A > S_B$ | $S_A > S_B$ |
| Inclination angle of sipe on acute angle side with respect to tire circumferential direction | 60° | 60° | 60° | 60° |
| Chamfered location of sipe (obtuse angle side or acute angle side) | Acute angle side | Acute angle side | Acute angle side | Acute angle side |
| Shape of sipe overall (linear or curved) | Curved | Curved | Curved | Curved |
| Opening of chamfered portion to main groove? | Yes | Yes | Yes | Yes |
| Ratio of overlap length L1 of chamfered portions to sipe length L | 0% | 0% | 0% | 0% |
| Number of chamfered locations (1 or 2) | 1 | 1 | 1 | 1 |
| Maximum width W1 of chamfered portion to sipe width W (W1/W) | 2x | 2x | 2x | 2x |
| Chamfering shape (parallel or not parallel) | Parallel | Parallel | Parallel | Parallel |
| Raised bottom portion of sipe? (center, end portion, or no) | Center | End portion | End portion | No |
| Height $H_{14}$ of raised bottom portion of sipe to maximum depth x of sipe ($H_{14}/x$) | 0.3x | 0.8x | 0.8x | — |
| Length $L_{14}$ of raised bottom portion to sipe length L ($L_{14}/L$) | 0.2x | 0.2x | 0.5x | — |
| Difference between groove area ratio $M1_A$ of chamfered portions and sipes on vehicle inner side and groove area ratio $M1_B$ of chamfered portions and sipes on vehicle outer side ($M1_A - M1_B$) | 2% | 2% | 2% | 8% |
| Difference between groove area ratio $M2_A$ on vehicle inner side and groove area ratio $M2_B$ on vehicle outer side ($M2_A - M2_B$) | 3% | 3% | 3% | 3% |
| Size relationship between pitch count $P_A$ on vehicle inner side and pitch count $P_B$ on vehicle outer side | $P_A = P_B$ | $P_A = P_B$ | $P_A = P_B$ | $P_A = P_B$ |
| Pitch count $P_B$ on vehicle outer side with respect to pitch count $P_A$ on vehicle inner side ($P_B/P_A$) | 1x | 1x | 1x | 1x |
| Steering stability performance on dry road surfaces | 109 | 111 | 113 | 107 |
| Steering stability performance on wet road surfaces | 109 | 107 | 106 | 107 |
| Uneven wear resistance performance | 109 | 109 | 109 | 109 |

|  | Example 17 | Example 18 | Example 19 |
|---|---|---|---|
| Arrangement of chamfer (both sides or one side) | Both sides | Both sides | Both sides |
| Length relationship between sipe length L and chamfer lengths $L_A$, $L_B$ | $L > L_A, L_B$ | $L > L_A, L_B$ | $L > L_A, L_B$ |
| Chamfer in area opposite chamfered portion? | No | No | No |

TABLE 2-continued

| | | | |
|---|---|---|---|
| Maximum depth x of sipe (mm) | 6 mm | 6 mm | 6 mm |
| Maximum depth y of chamfered portion (mm) | 2 mm | 2 mm | 2 mm |
| Size relationship between groove area $S_A$ of chamfered portions and sipes on vehicle inner side and groove area $S_B$ of chamfered portions and sipes on vehicle outer side | $S_A > S_B$ | $S_A > S_B$ | $S_A > S_B$ |
| Inclination angle of sipe on acute angle side with respect to tire circumferential direction | 60° | 60° | 60° |
| Chamfered location of sipe (obtuse angle side or acute angle side) | Acute angle side | Acute angle side | Acute angle side |
| Shape of sipe overall (linear or curved) | Curved | Curved | Curved |
| Opening of chamfered portion to main groove? | Yes | Yes | Yes |
| Ratio of overlap length L1 of chamfered portions to sipe length L | 0% | 0% | 0% |
| Number of chamfered locations (1 or 2) | 1 | 1 | 1 |
| Maximum width W1 of chamfered portion to sipe width W (W1/W) | 2x | 2x | 2x |
| Chamfering shape (parallel or not parallel) | Parallel | Parallel | Parallel |
| Raised bottom portion of sipe? (center, end portion, or no) | No | No | No |
| Height $H_{14}$ of raised bottom portion of sipe to maximum depth x of sipe ($H_{14}/x$) | — | — | — |
| Length $L_{14}$ of raised bottom portion to sipe length L ($L_{14}/L$) | — | — | — |
| Difference between groove area ratio $M1_A$ of chamfered portions and sipes on vehicle inner side and groove area ratio $M1_B$ of chamfered portions and sipes on vehicle outer side ($M1_A - M1_B$) | 8% | 8% | 8% |
| Difference between groove area ratio $M2_A$ on vehicle inner side and groove area ratio $M2_B$ on vehicle outer side ($M2_A - M2_B$) | 12% | 12% | 12% |
| Size relationship between pitch count $P_A$ on vehicle inner side and pitch count $P_B$ on vehicle outer side | $P_A = P_B$ | $P_A > P_B$ | $P_A > P_B$ |
| Pitch count $P_B$ on vehicle outer side with respect to pitch count $P_A$ on vehicle inner side ($P_B/P_A$) | 1x | 0.95x | 0.7x |
| Steering stability performance on dry road surfaces | 108 | 109 | 110 |
| Steering stability performance on wet road surfaces | 108 | 109 | 110 |
| Uneven wear resistance performance | 109 | 109 | 109 |

As understood from Tables 1 and 2, with the shape of the chamfered portions formed on the sipe thus devised, the tires of Examples 1 to 19 achieved enhanced uneven wear resistance performance as well as simultaneous enhancement of steering stability performance on both dry road surface and wet road surfaces.

On the other hand, in Comparative Example 1, the maximum depth y of the chamfered portion is extremely small, and thus the effect of enhancing steering stability performance on wet road surfaces could not be achieved. Further, in Comparative Example 2, the maximum depth y of the chamfered portion is extremely large, and thus the effect of enhancing steering stability performance on dry road surfaces could not be achieved.

The invention claimed is:

1. A pneumatic tire having an asymmetrical tread pattern on both sides of a tire center line and a designated vehicle mounting direction, the pneumatic tire comprising:
   in a tread portion,
   a plurality of main grooves extending in a tire circumferential direction;
   a plurality of ribs defined by the main grooves, including a center rib disposed on a tire center line;
   and a plurality of sipes that extend in a tire lateral direction in each rib of the plurality of ribs, the plurality of sipes including sipes in a ground contact region on a vehicle mounting inner side and sipes in a ground contact region on a vehicle mounting outer side;

each sipe of the plurality of sipes comprising a leading-side edge and a trailing-side edge, each leading-side edge and each trailing-side edge being provided with only a single chamfered portion, the chamfered portion having a length shorter than a length of the each sipe, and being provided with only a single non-chamfered region, where the chamfered portion of the leading-side edge is not disposed in an area opposite the chamfered portion of the trailing-side edge, the chamfered portion of the leading-side edge and the chamfered portion of the trailing-side edge comprising chamfered portions of the each sipe;

the each sipe in the center rib having one end opening in one of the main grooves on the vehicle mounting inner side and the other end terminating in the center rib without reaching the tire center line;

the each sipe having a maximum depth x (mm) and the chamfered portion having a maximum depth y (mm) that satisfy a relationship represented by $x \times 0.1 \leq y \leq x \times 0.3 + 1.0$;

the each sipe having a constant width in a range from an end portion of the chamfered portion positioned inward in a tire radial direction to a groove bottom of the sipe; and the plurality of sipes being configured so that an inner side total groove area ratio of the chamfered portions of the sipes included in the ground contact region on the vehicle mounting inner side and of the sipes included in the ground contact region on the vehicle mounting inner side is greater than an outer side total groove area ratio of the chamfered portions of the sipes included in the ground contact region on the vehicle mounting outer side and of the sipes included in the ground contact region on the vehicle mounting outer side, the inner side total groove area ratio being with respect to a total ground contact area of the ground contact region on the vehicle mounting inner side of the tread portion and the outer side total groove area ratio being with respect to a total ground contact area of the ground contact region on the vehicle mounting outer side of the tread portion.

2. The pneumatic tire according to claim 1, wherein the inner side total groove area ratio is from 3 to 15% greater than the outer side total groove area ratio.

3. The pneumatic tire according to claim 1, wherein an inner side total groove area ratio of the chamfered portions of the sipes included in the ground contact region on the vehicle mounting inner side, of the sipes included in the ground contact region on the vehicle mounting inner side and of other grooves included in the ground contact region on the vehicle mounting inner side is from 5 to 20% greater than an outer side total groove area ratio of the chamfered portions of the sipes included in the ground contact region on the vehicle mounting outer side, of the sipes included in the ground contact region on the vehicle mounting outer side and of other grooves included in the ground contact region on the vehicle mounting outer side, the inner side total groove area ratio being with respect to the total ground contact area of the ground contact region on the vehicle mounting inner side of the tread portion and the outer side total groove area ratio being with respect to the total ground contact area of the ground contact region on the vehicle mounting outer side of the tread portion.

4. The pneumatic tire according to claim 1, wherein a pitch count of groove elements extending in the tire lateral direction in the ground contact region on the vehicle mounting inner side is greater than a pitch count of groove elements extending in the tire lateral direction in the ground contact region on the vehicle mounting outer side.

5. The pneumatic tire according to claim 4, wherein the pitch count of the groove elements extending in the tire lateral direction in the ground contact region on the vehicle mounting outer side is from 0.5 to 0.9 times the pitch count of the groove elements extending in the tire lateral direction in the ground contact region on the vehicle mounting inner side.

6. The pneumatic tire according to claim 1, wherein the each sipe is inclined with respect the tire circumferential direction.

7. The pneumatic tire according to claim 6, wherein an inclination angle of the each sipe on an acute angle side with respect to the tire circumferential direction is from 40° to 80°.

8. The pneumatic tire according to claim 6, wherein the chamfered portion of the leading-side edge and the chamfered portion of the trailing-edge side are each disposed on an acute angle side of the each sipe.

9. The pneumatic tire according to claim 6, wherein the chamfered portion of the leading-side edge and the chamfered portion of the trailing-edge side are each disposed on an obtuse angle side of the each sipe.

10. The pneumatic tire according to claim 1, wherein the each sipe is at least partially curved or bent in a plan view.

11. The pneumatic tire according to claim 1, wherein the chamfered portion of the leading-side edge or the chamfered portion of the trailing-side edge opens to one of the main grooves.

12. The pneumatic tire according to claim 1, wherein the chamfered portion of the leading-side edge or the chamfered portion of the trailing-side edge terminates inside the each rib.

13. The pneumatic tire according to claim 1, wherein an overlap length of the chamfered portion formed on the leading-side edge of the each sipe and the chamfered portion formed on the trailing-side edge of the sipe is from −30% to 30% of the length of the each sipe.

14. The pneumatic tire according to claim 1, wherein the chamfered portions have a maximum width of from 0.8 to 5.0 times a width of the each sipe.

15. The pneumatic tire according to claim 1, wherein the chamfered portions extend in parallel with the each sipe.

16. The pneumatic tire according to claim 1, wherein the each sipe further comprises a raised bottom portion.

17. The pneumatic tire according to claim 16, wherein the raised bottom portion is disposed in an area other than an end portion of the each sipe and has a height of from 0.2 to 0.5 times the maximum depth x of the each sipe.

18. The pneumatic tire according to claim 16, wherein the raised bottom portion is disposed at an end portion of the each sipe has a height of from 0.6 to 0.9 times the maximum depth x of the each sipe.

19. The pneumatic tire according to claim 16, wherein the raised bottom portion has a length of from 0.3 to 0.7 times the length of the each sipe.

\* \* \* \* \*